United States Patent
Beurer et al.

(10) Patent No.: US 11,486,526 B2
(45) Date of Patent: Nov. 1, 2022

(54) FIXING RING, AND ASSEMBLY OF A HOSE AND FIXING RING

(71) Applicant: Xenios AG, Heilbronn (DE)

(72) Inventors: Matthias Beurer, Stuttgart (DE); Chris Schomburg, Heilbronn (DE)

(73) Assignee: Xenios AG, Heilbronn (DE)

( * ) Notice: Subject to any disclaimer, the term of this patent is extended or adjusted under 35 U.S.C. 154(b) by 364 days.

(21) Appl. No.: 16/611,509

(22) PCT Filed: Apr. 13, 2018

(86) PCT No.: PCT/DE2018/000103
§ 371 (c)(1),
(2) Date: Nov. 7, 2019

(87) PCT Pub. No.: WO2018/206023
PCT Pub. Date: Nov. 15, 2018

(65) Prior Publication Data
US 2020/0124216 A1    Apr. 23, 2020

(30) Foreign Application Priority Data

May 8, 2017 (DE) ...................... 10 2017 004 353.1

(51) Int. Cl.
*F16L 33/22* (2006.01)
(52) U.S. Cl.
CPC ......... *F16L 33/226* (2013.01); *F16L 2201/10* (2013.01)
(58) Field of Classification Search
CPC .................. F16L 33/226; F16L 2201/10
See application file for complete search history.

(56) References Cited

U.S. PATENT DOCUMENTS

| | | | | |
|---|---|---|---|---|
| 3,290,067 A | * | 12/1966 | Buckle | F16L 31/00 285/247 |
| 4,736,969 A | | 4/1988 | Fouts | |
| 4,964,305 A | * | 10/1990 | Raulins | G01L 5/24 116/212 |
| 6,279,242 B1 | * | 8/2001 | Williams | F16L 19/00 285/93 |
| 2005/0104374 A1 | * | 5/2005 | Steur | F16L 33/226 285/247 |

(Continued)

FOREIGN PATENT DOCUMENTS

| | | |
|---|---|---|
| CN | 104272003 A | 1/2015 |
| CN | 205842050 U | 12/2016 |

(Continued)

OTHER PUBLICATIONS

International Search Report in PCT/DE2018/000103, dated Jul. 27, 2018.

*Primary Examiner* — Zachary T Dragicevich
*Assistant Examiner* — James A Linford
(74) *Attorney, Agent, or Firm* — Collard & Roe, P.C.

(57) ABSTRACT

A fixing ring can be pushed onto a hose in such a way that its outside is freely accessible and an inside is in contact with the hose. The inside includes a cylindrically shaped internal thread and the fixing ring includes a holder with an inner diameter, which is smaller than the inner diameter of the internal thread. This provides a reliable process, to fasten a hose on a nozzle of a connector via a fixing ring producible in a simple manner.

17 Claims, 8 Drawing Sheets

(56) References Cited

U.S. PATENT DOCUMENTS

Figure 17:
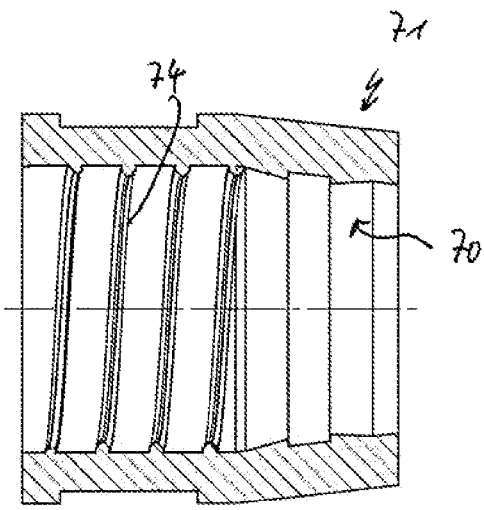

2014/0103641 A1* 4/2014 Hickman ............... F16L 15/08
                                                                          285/93
2014/0353965 A1    12/2014  Inoue et al.

FOREIGN PATENT DOCUMENTS

| DE | 20 2005 006580 U1 | 6/2005 |
|----|-------------------|--------|
| EP | 0 833 092 A1 | 4/1998 |
| EP | 0 833 095 A1 | 4/1998 |
| WO | 2008/041224 A1 | 4/2008 |

* cited by examiner

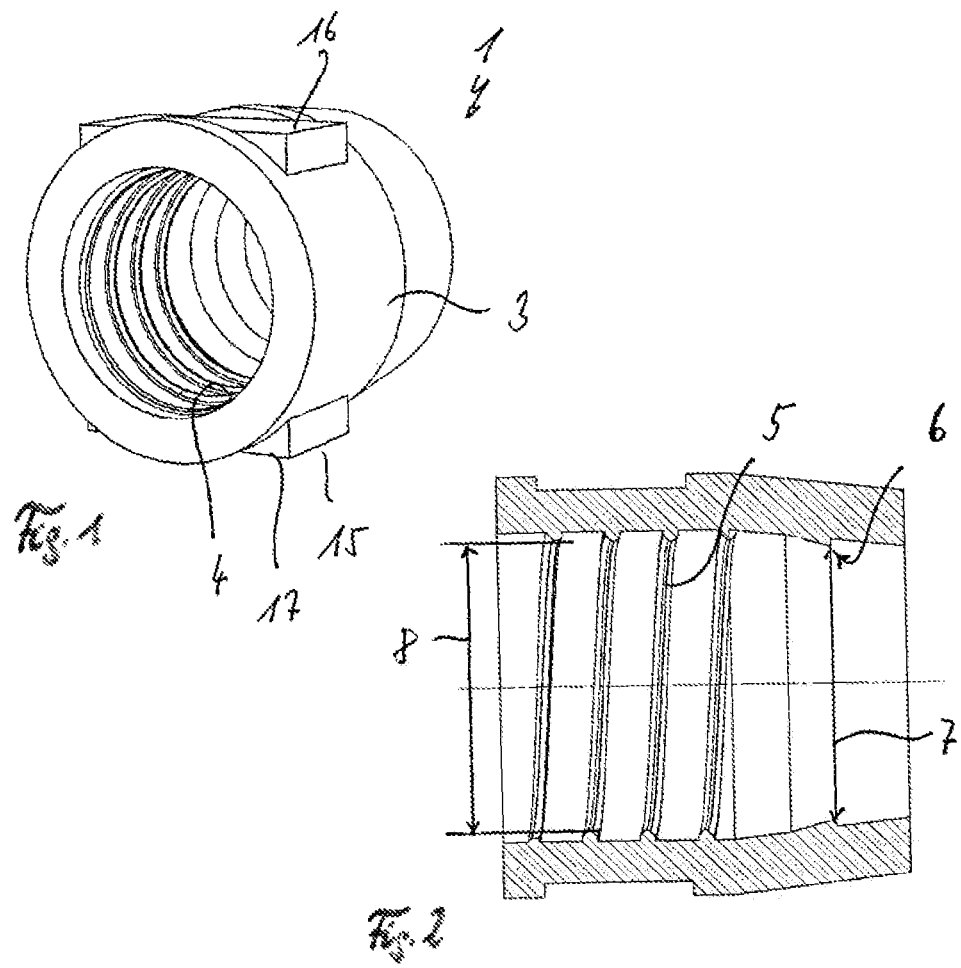
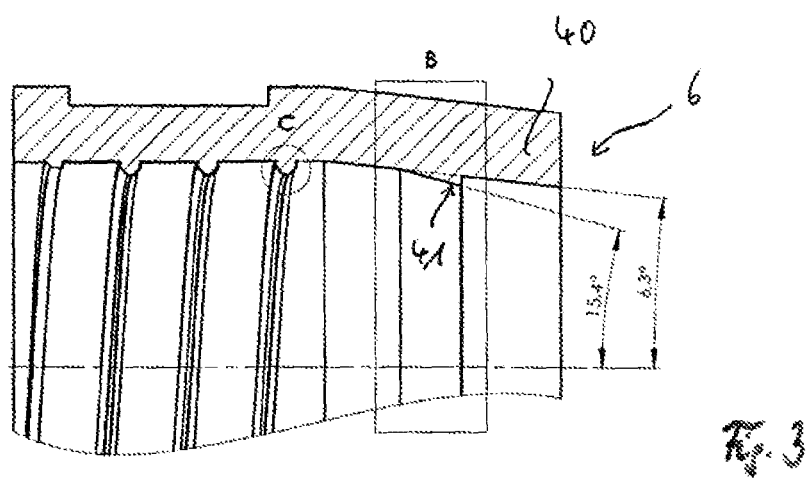

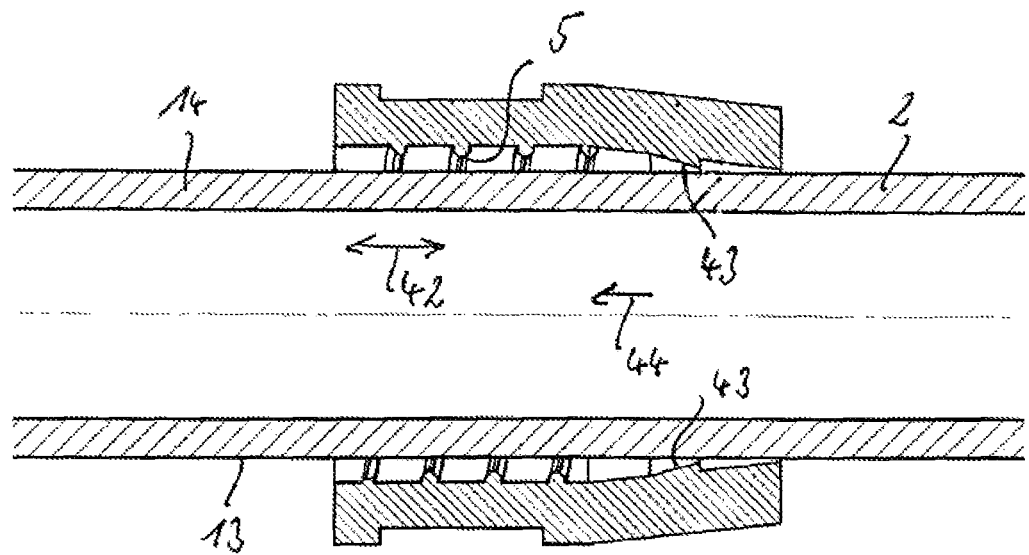
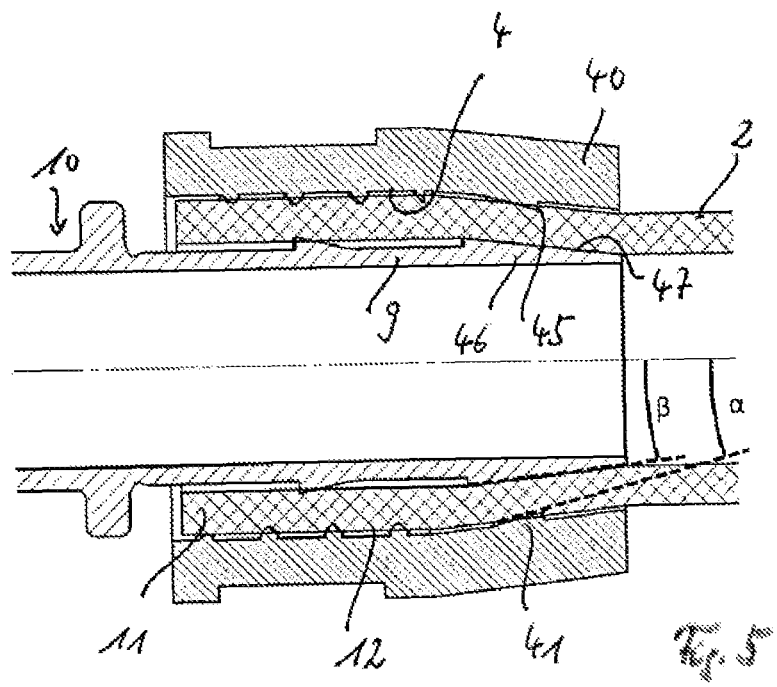

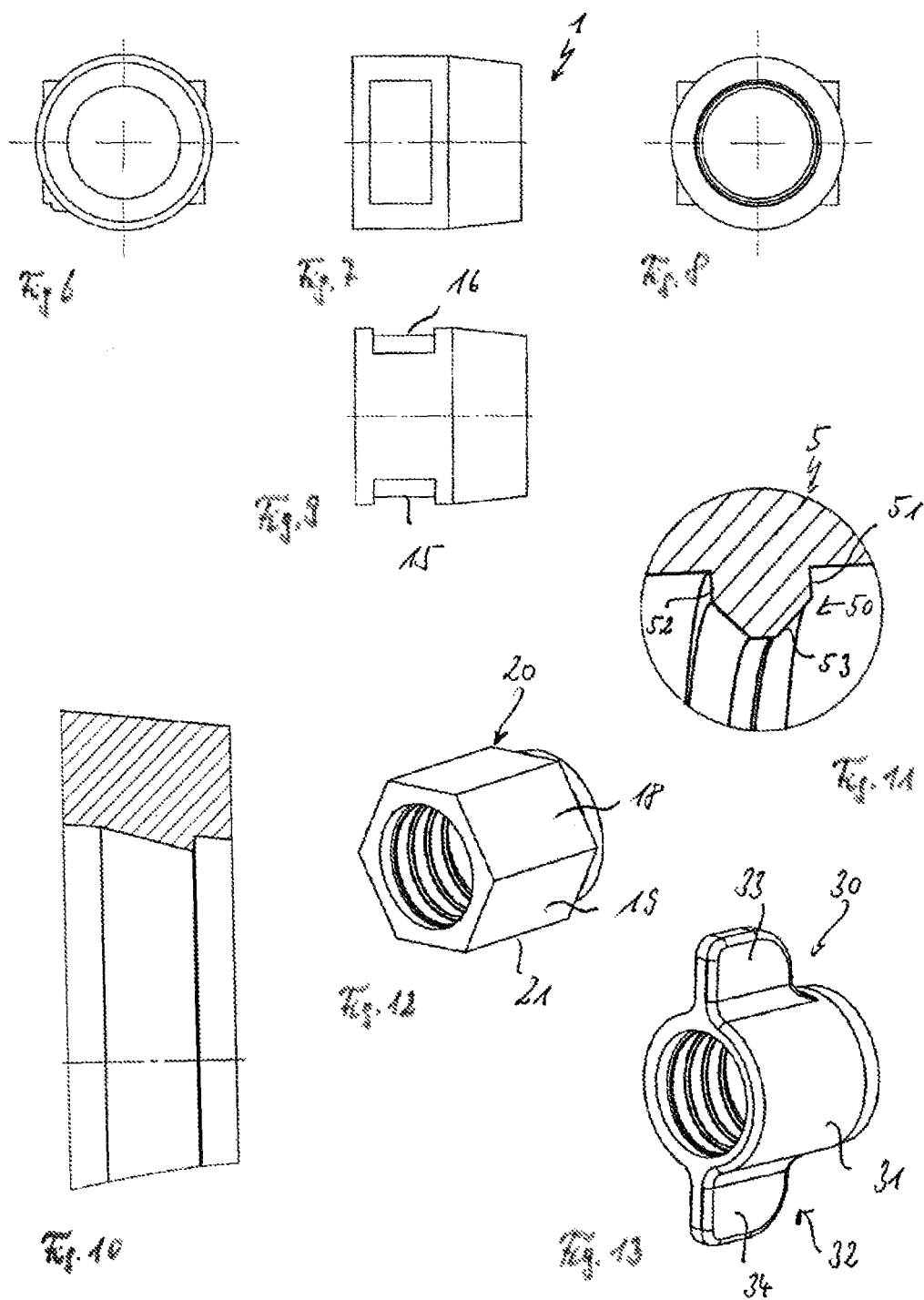

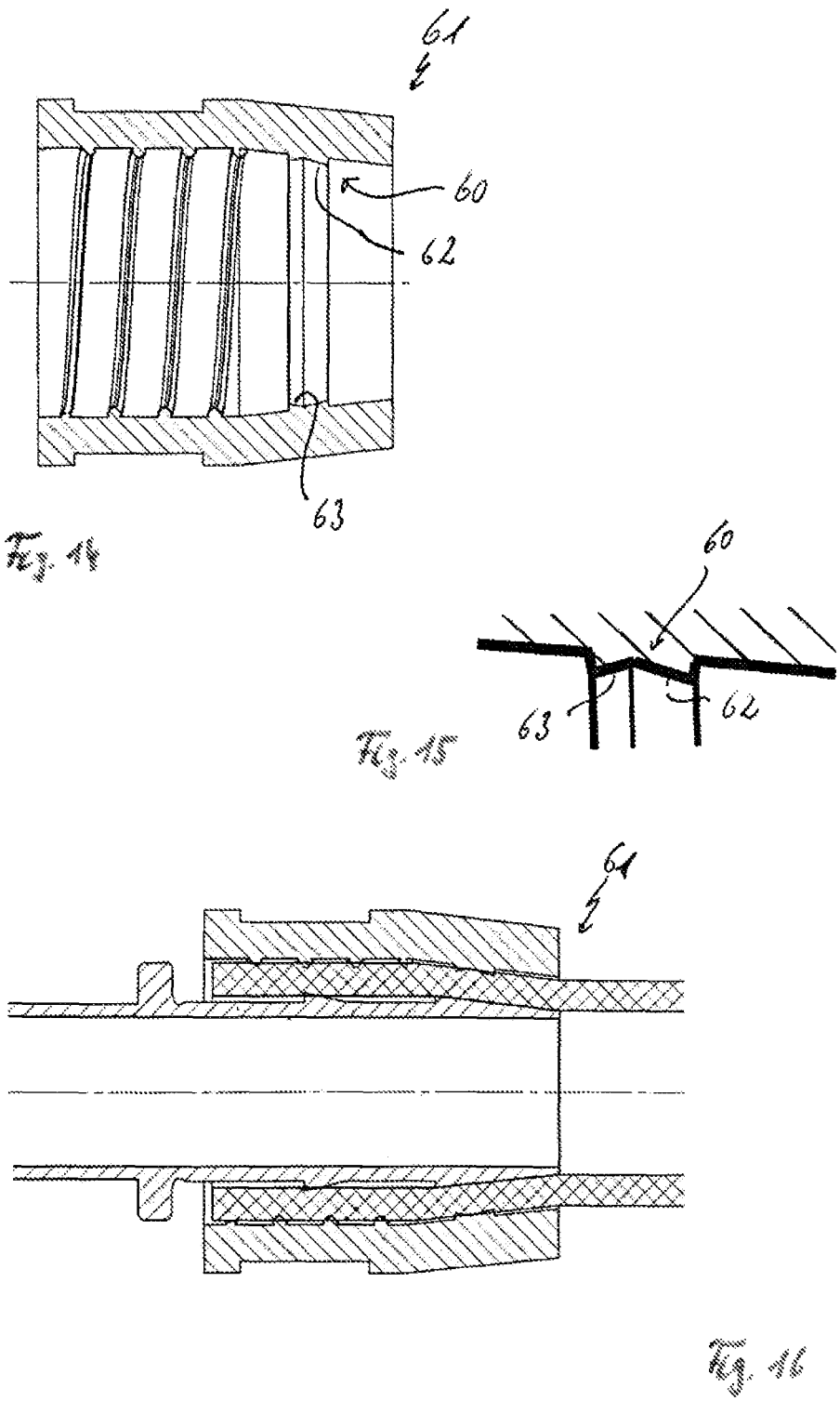

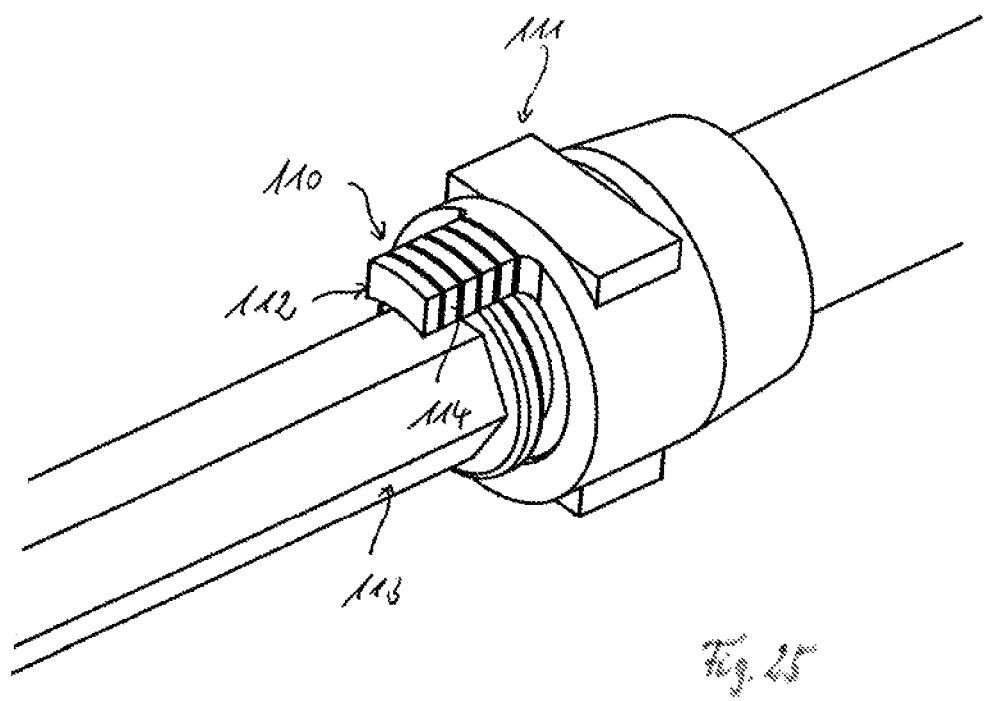
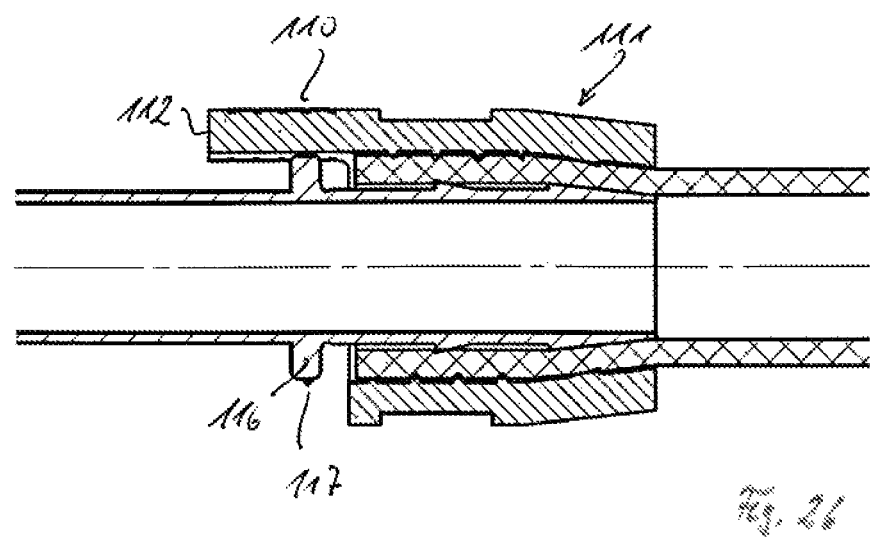

FIXING RING, AND ASSEMBLY OF A HOSE AND FIXING RING

CROSS REFERENCE TO RELATED APPLICATIONS

This application is the National Stage of PCT/DE2018/000103 filed on Apr. 13, 2018, which claims priority under 35 U.S.C. § 119 of German Application No. 10 2017 004 353.1 filed on May 8, 2017, the disclosure of which is incorporated by reference. The international application under PCT article 21(2) was not published in English.

The invention relates to a fixing ring which can be pushed onto a hose in such a way that its outside is freely accessible and an inside is in contact with the hose.

Fixing rings for hoses, such as in particular garden hoses, are known as GARDENA connectors. The hose is pushed over a hose nozzle with gripping arms provided on the hose nozzle, which are pressed from the outside via a retaining ring against the hose. The retaining ring has an internal thread, which cooperates with an external thread of the nozzle and when there is a relative movement between the retaining ring and the nozzle, the holding arms are pressed via an inclined plane against the outside of the hose, in order to retain the hose securely between the holding arm and the hose nozzle.

This two-part arrangement is expensive to produce and provides only an insecure connection between hose and nozzle.

In the medical field hose nozzles are used, which are pressed against the hose via a sleeve ring. Such a system is known as BarbLock®. In addition it is known to push hoses onto a structured connector and retain them on the connector by means of a cable strap.

The disadvantage of such connections consists in that after sterilisation or due to ageing of the hose there is a danger of the connection being no longer secure with leaks starting to occur.

The invention is therefore based on the objective of further developing such a fixing ring and proposing an arrangement consisting of a hose and such a fixing ring.

The objective on which the invention is based is achieved with a generic fixing ring, the inside of which comprises a cylindrically shaped internal thread and a holder, which has an inner diameter smaller than the inner diameter of the internal thread.

The cylindrically shaped internal thread of the fixing ring makes it possible to press a hose, which has been pushed onto a connector, against the connector and, by pressing the thread into the outside of the hose, to press the hose against the connector, at least over a partial section of the connector. The holder with the smaller inner diameter keeps the hose outside the threaded region.

It is advantageous if such a fixing ring is made in one piece.

The internal thread has at least one cylindrically shaped part which allows the hose to be pressed against a connector over the length of the cylindrically shaped thread section. The internal thread may however also be partly conically-shaped, in order to increase contact pressure during screwing-on and also in order to be able to press the hose against a conical region of a connector.

In order to rotate the connector relative to the hose in a simple manner, it is proposed that the hose is provided with a drive profile on its outside.

This drive profile may comprise parallel stop surfaces for an open-ended spanner or is provided with wings for screwing by hand.

The fixing ring may be manufactured in a simple manner from plastic. The simple design makes it possible to produce the fixing ring as an injection-moulded part. This can be done using a two-component material, where in particular the thread consists of a harder material than other parts of the fixing ring. It is however also possible to produce the fixing ring from metal or other materials and composites.

It is advantageous if the holder comprises a conically tapering end. The inner diameter of the internal thread may be larger than the outer diameter of hose, while the conically tapering end approximately corresponds, at least in one region, to the outer diameter of the hose or even comprises a smaller outer diameter. This end may also be designed to be elastic in order to ensure that the end is in contact with the outside of the hose.

It is advantageous if a circumferential elevation is arranged in the conically tapering end. This elevation may comprise a ramp and/or a thorn which is in firm contact with the outside of the hose.

In order to make it easy to fit the fixing ring onto the hose or to make it difficult to withdraw the hose from the fixing ring, the elevation may comprise a ramp in extension direction of the hose.

Depending on the embodiment the ramp may be falling away radially outwards in direction of the thread or may be rising radially inwards, and also a number of ramps may be provided which fall away radially outwards or rise radially inwards. An additional sealing effect may be achieved due to uniform encircling and distribution of pressure. The elevation may also comprise a rounded-off inner edge so that the material of the hose cannot be damaged by it.

Furthermore it is proposed as an option that the fixing ring comprises at least one elastic hook. Advantageously a number of hooks are arranged on the circumference of the fixing ring. Insofar as the connector comprises an undercut, these hooks can, as the fixing ring is screwed onto a hose pushed onto the nozzle of the connector, glide along the connector until they snap in behind the undercut. In this way the user is notified mechanically, optically and possibly even acoustically, when the fixing ring has been screwed far enough onto the hose.

Besides the fixing ring may have a scale, which indicates to the user, how far the fixing ring has been screwed onto the hose and the connector.

The objective underlying the invention is also achieved using an arrangement consisting of a hose and a fixing ring, where the outside of the hose is produced from a softer material than the internal thread of the fixing ring, where the hose comprises a threadless surface and the fixing ring is screwed onto the hose.

This arrangement shows the function of the fixing ring, which can be screwed on in direction of the connector after the hose from a softer material has been pushed onto the nozzle of the connector, whilst the internal thread presses an external thread into the soft hose material and thereby presses the hose against the nozzle of the connector.

It is advantageous if the hose is a PVC hose.

Depending on the shape of the thread and the strength of the hose, the thread of the screwed-on fixing ring may be merely pressed against the hose or the thread is cut into the hose. Rounded-off thread turns preserve the hose, whilst pointed thread turns may cut into the hose. Pressing the fixing ring against the hose with rounded-off thread turns ensures a firm press-fit and cutting-in increases the stability against withdrawing the hose from the fixing ring. It depends on the application as to whether to provide a thread with pointed thread turns or with rounded-off thread turns, and combinations of pointed and rounded-off thread turns are also possible.

The maximum cutting depth may for example range from 0.1 mm to 3 mm. Hose sizes may for example be ⅜ or ¼ inch and the wall thickness is adapted to the hose material, the cutting depth or the contact pressure.

Furthermore it is advantageous if a connector and preferably a nozzle of a connector are arranged in the hose, so that during screwing-on of the connector the inside of the hose is supported and/or the hose is stretched towards the outside.

It is advantageous if the connector comprises a circumferential ramp in order to facilitate pushing the hose onto the connector and allowing the inner diameter of the hose to stretch.

The connector and the fixing ring can cooperate so as to lock into each other in order to retain the fixing ring on the connector.

In a further development it is proposed that the arrangement comprises a pointer and a scale, which are arranged such, that as the fixing ring is pushed onto the connector, the pointer is moved relative to the scale. The scale may be arranged on the fixing ring, whilst the pointer is arranged on a connector or the scale is arranged on the connector and the pointer on the fixing ring.

One advantageous use provides for a screw with at least partially conical internal thread to be used for as a fixing means for fastening the hose on a connector. With this arrangement the internal thread can be cut into the hose during fastening or just be in firm contact with the hose.

Figure 18:
Figure 19:
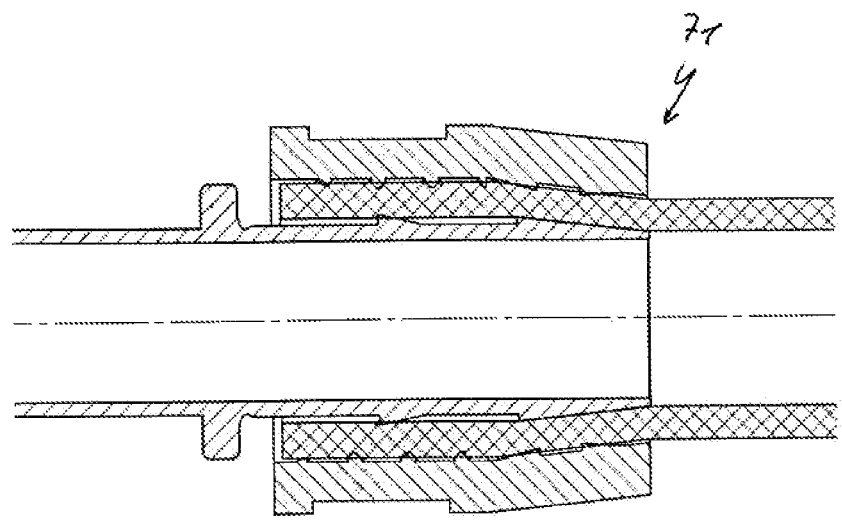
Figure 10:
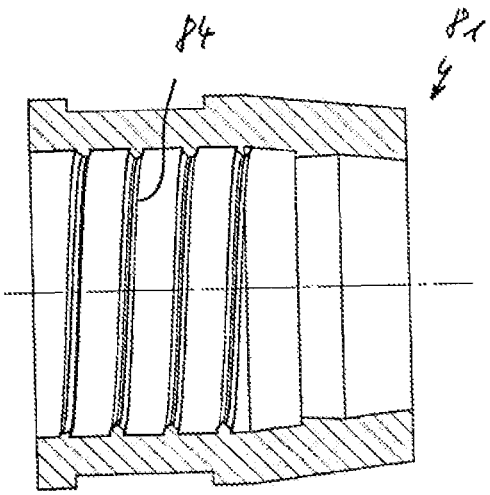
Figure 11:
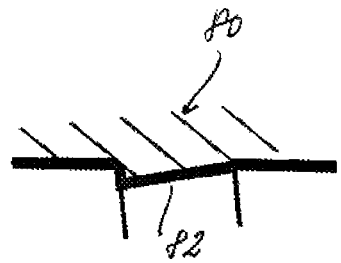
Figure 12:
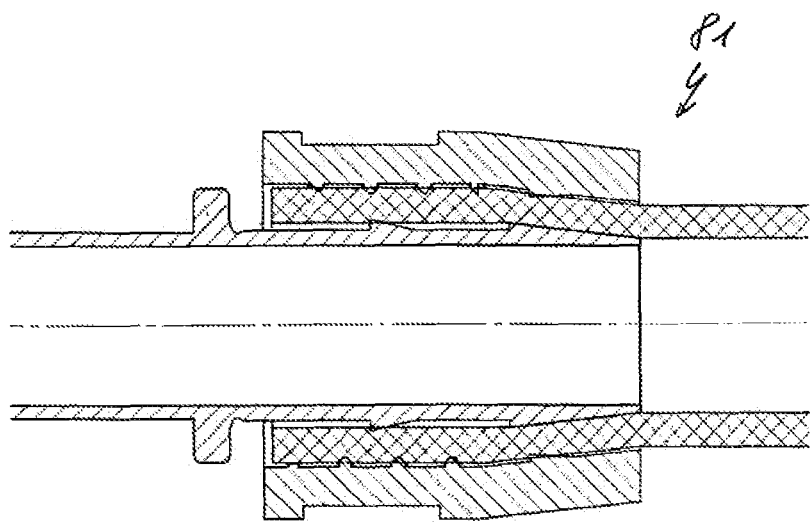
Figure 23:
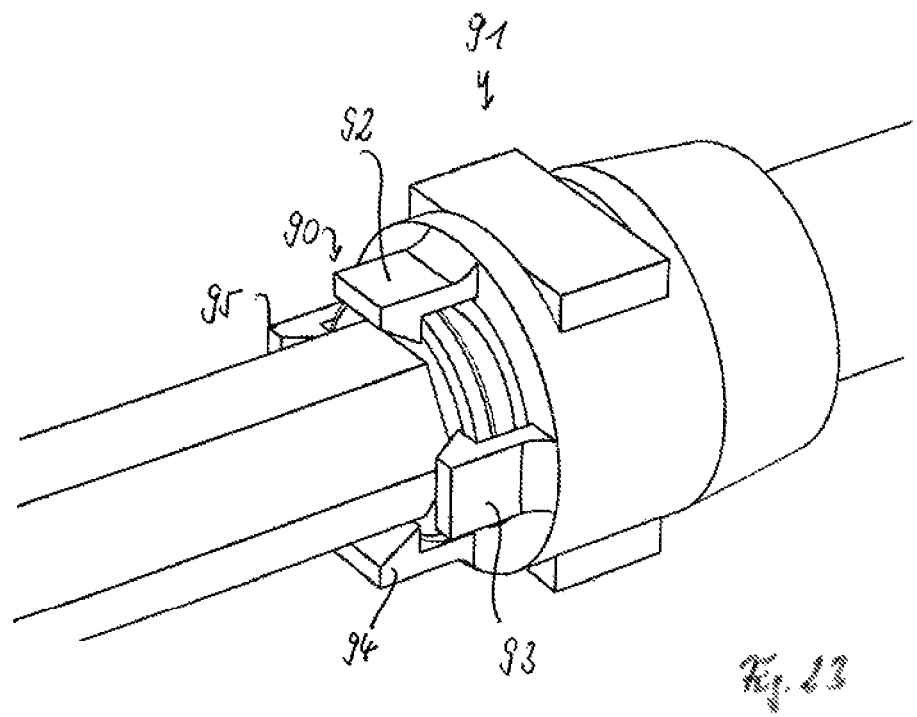
Figure 24:
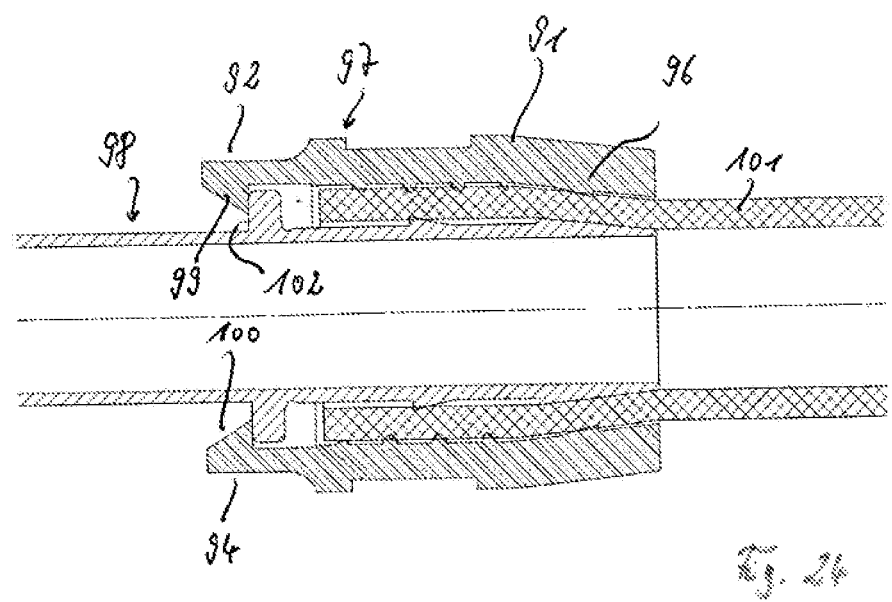

Advantageous variants are shown in the drawing and will now be explained in detail. In the drawing FIG. 1 shows a three-dimensional view of a connector, FIG. 2 shows a cut through the connector shown in FIG. 1, FIG. 3 shows an enlarged cut-out from FIG. 2, FIG. 4 shows the cooperation between the fixing ring and a hose, FIG. 5 shows, how the hose with the fixing ring is pressed against the nozzle of a connector, FIG. 6 shows the back of the fixing ring shown in FIG. 1, FIG. 7 shows a top view onto the fixing ring shown in FIG. 1, FIG. 8 shows the front of the fixing ring shown in FIG. 1, FIG. 9 shows a side view of the fixing ring shown in FIG. 1, FIG. 10 shows cut-out B from FIG. 3, FIG. 11 shows cut-out C from FIG. 3, FIG. 12 shows an alternative embodiment with a hexagonal thread on the outside of the fixing ring, FIG. 13 shows a fixing ring with wings as drive profile, FIG. 14 shows an alternative variant of a fixing ring with two opposing ramps, FIG. 15 schematically shows the arrangement of the ramps, FIG. 16 shows a cut through the fixing ring shown in FIG. 1 on a hose in the region of a connector, FIG. 17 shows a cut through an alternative embodiment of a fixing ring with double ramp, FIG. 18 schematically shows the arrangement of the ramps, FIG. 19 shows a cut through the fixing ring shown in FIG. 17 on a hose in the region of the connector, FIG. 20 shows a cut through an alternative embodiment of a fixing ring with single ramp, FIG. 21 schematically shows the construction of the ramp, FIG. 22 shows a cut through the fixing ring shown in FIG. 20 on a hose in the region of the connector, FIG. 23 shows a perspective view of a fixing ring with elastic hooks, FIG. 24 shows a cut through the fixing ring shown in FIG. 23, FIG. 25 shows a perspective view of a fixing ring with a scale and FIG. 26 shows a cut through the fixing ring shown in FIG. 25.

The fixing ring shown in FIG. 1 can be pushed onto a hose 2 shown in FIGS. 4 and 5. Its outside 3 is freely accessible, whilst an inside 4 of the fixing ring 1 is in contact with the hose 2. This inside 4 has a cylindrically shaped internal thread 5. Moreover the fixing ring has a holder 6 with an inner diameter 7, which is smaller than the inner diameter 8 of the internal thread 5.

This fixing ring is constructed in one piece and can initially, as shown in FIG. 4, be pushed onto a hose 2 and then, as shown in FIG. 5, after the hose has been pushed onto a nozzle 9 of a connector 10, be screwed by rotation onto the hose at the hose end 11. During this process the thread 5 presses itself into the outside 12 of the hose 2, which comprises a threadless surface 13 and is made of a softer material 14 than the internal thread 5 of the fixing ring 1.

In the exemplary embodiment the internal thread 5 is shown as being cylindrical. It may however, at least partially, be conically shaped.

In the embodiment shown in FIGS. 1 to 11 the drive profile 15 for an open-ended spanner (not shown) is in the form of two stop surfaces 16, 17. In the embodiment shown in FIG. 12 two further stop surfaces 18, 19 are additionally provided, so that this fixing ring 20 has a hexagonal profile on its outside.

The fixing ring 30 shown in FIG. 13 comprises a drive profile 32 on its outside 31 with two wings 33 and 34 for screwing on by hand.

The holder 6 of the fixing ring 1 consists of a conically tapering end 40 with a circumferential elevation 41. This elevation 41, in the extension direction 42 of hose 2, comprises a ramp 43 on one side, which rises radially outwards in direction 44 of the thread 5.

The conically tapering end 40 thus presses the circumferential edge 45 into the hose 2 at the radially inner end of the ramp 43, in order to press the hose against the conical end 46 of the nozzle 9 of the connector 10. In the embodiment the conical end 36 of the nozzle has a circumferential oblique surface 47, which is arranged at an angle β obliquely to the extension 42 of the hose 2. The ramp 43 of elevation 41 is arranged at an angle α obliquely to the extension 42 of the hose 2. Since the angle β is smaller than the angle α, the ramp 43 presses the hose 2 against the circumferential conical surface 47 of the nozzle, thereby slightly penetrating into the outside 12 of the hose 2 in order to retain the hose.

FIG. 11 shows an enlarged view of the shape of the thread 5. The thread turns 50 are spaced apart. They have two parallel flanks 51, 52 and a trapeze-shaped inner surface 53. This special thread 2 retains the hose 2 and presses it against the nozzle 9 of the connector 10, without putting unnecessary stress on the hose.

An alternative embodiment of a holder 60 on the fixing ring 61 is shown in FIG. 14. This holder 60 has a first ramp 62, which, as the ramp 43, falls radially outwards away in direction of thread 5, and a second ramp 63, which rises radially inwards in direction of thread 5. With this arrangement the second ramp 63 in particular prevents withdrawal of the hose from the fixing ring 61.

A holder 70 on a fixing ring 71 shows a ramp 72 and a ramp 73 spaced apart from one another, the ramp 72 falling away radially outwards in direction of the thread 74 and the ramp 73 spaced further apart and rising radially inwards in direction of the thread 74.

Finally FIGS. 20 to 22 show a holder 80 on a fixing ring 81 with a ramp 82 which rises radially inwards in direction of the thread 84.

FIGS. 23 and 24 show a snap-in device 90 on a fixing ring 91, which comprises four snap-in hooks 92, 93, 94 and 95. These snap-in hooks are provided at the end 97 of the fixing ring 91 opposite the holder 96 and they cooperate in a snap-in manner as part of the fixing ring 91 with the connector 81. To this end the hooks 92 to 95 comprise an inclined plane 99, 100 (marked only by way of example), which during screwing-on of the fixing ring 91 onto the hose 101 presses the hooks 92 to 95 radially apart from one another. As soon as the hooks 92 to 95 enter the region of the stop surface 102 of the connector 98, they jump radially inwards in order to retain the fixing ring 91 on the connector 98.

FIGS. 25 and 26 show a scale 110 on a connector 113. To this end the fixing ring 111, in a partial region 112, was lengthened in direction of the connector 113, in order to be able, via markings 114, to read the relative position of the fixing ring 111 relative to the connector 113. The markings 114 may also be realised as grooves. The stop 102 or the circumferentially protruding ring 116 serves as pointer 117 on the scale 110.

The invention claimed is:

1. An arrangement comprising:
   a hose (2);
   a connector (10) having a nozzle (9) with a conical end (46); and
   a fixing ring (1),
   wherein the connector (10) can be arranged in the hose (2) and the fixing ring (1) can be screwed onto the hose (2) in such a way that an outside (3) of the fixing ring is freely accessible and an inside (4) of the fixing ring is in contact with the hose (2),
   wherein the inside (4) comprises a cylindrically shaped internal thread (5),
   wherein the fixing ring (1) comprises a holder (6) formed by a conically tapering end (40) outside the threaded region, the holder (6) having an inner diameter (7) smaller than the inner diameter (8) of the internal thread (5),
   wherein a circumferential elevation (41) is arranged in the conically tapering end (40), the circumferential elevation (41) comprising a ramp (43) on one side in extension direction (42) of the hose (2) and a circumferential edge (45) at the radially inner end of the ramp (43),
   wherein the internal thread (5) is adapted to press the hose (2), which has been pushed onto the connector (10), against the connector (10) and, by pressing the thread (5) into the outside of the hose (2), to press the hose (2) against the connector (10), at least over a partial section of the connector (10),
   wherein the elevation (41) is designed such that, in addition to the thread (5), also the edge (45) is pressed into the outside of the hose (2), to press the hose (2) against the conical end (46) of the nozzle (9) of the connector (10); and
   wherein the outside (12) of the hose (2) is produced from a softer material (14) than the internal thread (5) of the fixing ring (1), and the hose (2) comprises a threadless surface (13).

2. The arrangement according to claim 1, wherein the hose (2) is a PVC hose.

3. The arrangement according to claim 1, wherein the thread is cut at least partially into the hose.

4. The arrangement according to claim 1, wherein the thread, at least in sections, is not cut into the hose, but only pressed against the hose.

5. The arrangement according to claim 1, wherein the connector (10) comprises at least one circumferential ramp (46).

6. The arrangement according to claim 1, wherein the connector (10) and the fixing ring (91) cooperate in a snap-in manner.

7. The arrangement according to claim 1, wherein a pointer (117) and a scale (110) are arranged on the arrangement in such a manner that when the fixing ring (111) is pushed onto the connector (113) the pointer (117) is moved relative to the scale (110).

8. The arrangement according to claim 1, wherein the fixing ring is in one piece.

9. The arrangement according to claim 1, wherein the internal thread (5) of the fixing ring (1) is shaped in a partially conical manner.

10. The arrangement according to claim 1, wherein the fixing ring (1) further comprises a drive profile (15) on the outside (3) of the fixing ring.

11. The arrangement according to claim 10, wherein the drive profile (15) comprises two parallel stop surfaces (16, 17) for an open-ended spanner.

12. The arrangement according to claim 10, wherein the drive profile (32) comprises wings (33, 34) for screwing-on by hand.

13. The arrangement according to claim 1, wherein the fixing ring is manufactured from a plastic.

14. The arrangement according to claim 1, wherein the ramp (43) falls away radially outwards in direction of the thread (5).

15. The arrangement according to claim 1, wherein the ramp (63) rises radially inwards in direction of the thread (5).

16. The arrangement according to claim 1, wherein the fixing ring (1) further comprises at least one elastic hook (92 to 95).

17. The arrangement according to claim 1, wherein the fixing ring (1) further comprises a scale (110).

* * * * *